United States Patent [19]

Kamiya et al.

[11] Patent Number: 4,818,487
[45] Date of Patent: Apr. 4, 1989

[54] ALUMINUM BEARING ALLOY

[75] Inventors: Soji Kamiya; Yuji Yokota; Tatsuhiko Fukuoka; Yoshio Kumada, all of Aichi, Japan

[73] Assignee: Taiho Kogyo Co., Ltd., Aichi, Japan

[21] Appl. No.: 106,019

[22] Filed: Oct. 8, 1987

Related U.S. Application Data

[63] Continuation of Ser. No. 908,433, Sep. 17, 1986, abandoned.

[30] Foreign Application Priority Data

Sep. 17, 1985 [JP] Japan .................. 60-204679

[51] Int. Cl.$^4$ .............................................. C22C 21/00
[52] U.S. Cl. ...................................... 420/530; 428/653
[58] Field of Search ............... 420/530, 537, 548, 553; 428/653

[56] References Cited

U.S. PATENT DOCUMENTS

| | | | |
|---|---|---|---|
| 3,732,083 | 5/1973 | Brasse et al. | 420/530 |
| 3,809,551 | 5/1974 | Morisaki | 420/530 |
| 4,153,756 | 5/1979 | Iwahana et al. | 420/590 |
| 4,278,740 | 7/1981 | Nara et al. | 420/530 |
| 4,340,649 | 7/1982 | Nara et al. | 420/530 |
| 4,375,500 | 3/1983 | Nara et al. | 420/530 |
| 4,617,172 | 10/1986 | Mori | 420/530 |

FOREIGN PATENT DOCUMENTS

| | | | |
|---|---|---|---|
| 72313 | 6/1977 | Japan | 420/530 |
| 56-35744 | 4/1981 | Japan | 420/530 |
| 56-35743 | 4/1981 | Japan . | |
| 123345 | 9/1981 | Japan | 420/530 |
| 164952 | 10/1982 | Japan | 420/530 |
| 188640 | 11/1982 | Japan | 420/530 |
| 58-11334 | 1/1983 | Japan . | |
| 254095 | 3/1970 | U.S.S.R. | 420/530 |
| 470248 | 8/1937 | United Kingdom . | |
| 569337 | 5/1945 | United Kingdom | 420/530 |
| 2066846 | 7/1981 | United Kingdom | 420/530 |
| 2067219 | 7/1981 | United Kingdom . | |

Primary Examiner—L. Dewayne Rutledge
Assistant Examiner—Robert L. McDowell
Attorney, Agent, or Firm—Sughrue, Mion, Zinn, Macpeak & Seas

[57] ABSTRACT

An aluminum bearing alloy to which is added 3–20% by weight of tin, 0.2–2% of copper and either 0.2–1.2% of manganese or 0.1–1% of zirconium. Additionally 0.1–5% of lead and/or 1.5–8% of silicon may be added.

2 Claims, 3 Drawing Sheets

ALUMINUM BEARING ALLOY

This is a continuation of application Ser. No. 06/908,433, filed Sept. 17, 1986 abandoned.

BACKGROUND OF THE INVENTION

1. Field of the Invention

The present invention generally relates to aluminum bearing metal. It particularly relates to an aluminum bearing metal having improved strength at a high temperature and improved resistance to seizure and which is increased in fatigue strength.

2. Background Art

A conventional object in the field of metallurgy has been intended to improve aluminum bearing metal in its strength at a high temperature, in seizure-resistance, in fatigue strength, and so on, as disclosed, for example, in Japanese Patent Unexamined Publication Nos. 87917/78 and 35744/81.

The aluminum bearing metal disclosed in Japanese Patent Publication No. 12131/77 consists of, by weight percentage, 3–40% of Sn; 0.1–5% of Pb; 0.1–3% exclusive of Sb; 0.2–2% of Cu; and the remaining parts of Al. Further, if necessary, 0.2–3% of any one of Ni, Mn, and Si is added to the above-mentioned components.

The aluminum bearing metal disclosed in Japanese Patent Publication No. 14866/83 consists of, by weight percentage, 3.5–35% of Sn; 0.1–1% of Cr; 1–10% of Si; 1–10% of one or more of Mn, Sb, Ti, Ni, Fe, Zr, Mo, and Co, the contents being not larger than 10% in total; and the remaining parts of Al. Further, if necessary, 3.0% by weight or less of Cu and/or Mg is added to the above-mentioned components. Furthermore, 9.0% by weight or less of one or more of Pb, Bi, and In are added to the above-mentioned components in place of or together with the above-mentioned fraction of Cu and/or Mg.

The aluminum bearing metal disclosed in Japanese Patent Publication No. 21447/77 consists of, by weight percentage 3.5–4.5% of Sn; 3.5–4.5% of Si; 0.7–1.7% of Cu; and the remaining parts of Al. The Al contains ordinary impurities such as 0.5% or less of Fe, 0.2% or less of Mn, 0.2% or less of Mg, 0.05% or less of each of B, Cd, Zn, and Pb, etc.

The aluminum bearing metal disclosed in Japanese Patent Unexamined Publication No. 35744/81 consists of, by weight percentage, 3–40% of Sn; 0.1–9% of Pb; 0.1–3% exclusive of Sb; 3.0–10% in total of one or more of Si, Ni, Mn, Ti, Fe, Zr, Mo, Co, V, and Nb; and the remaining parts of Al. Further, if necessary, 0.1–3.0% by weight of Cu and/or Mg is added to the above-mentioned components.

Each of the known aluminum bearing metal as described above has properties superior to those of other conventional ones. Recently, however, materials for bearings have been used under the conditions of higher loads and higher temperatures as internal combustion engines are required to be miniaturized and to have a high power output. Under these demanding conditions as described above, the conventional materials for bearings have experienced difficulties such as fatigue failure, abnormal wear, seizure, and so on.

SUMMARY OF THE INVENTION

Accordingly, an object of the invention is to provide an aluminum bearing metal which continues to operate well at high temperatures.

The bearing metal of the invention has aluminum as its main constituent. To the aluminum is added 3–20% of tin and 0.2–2.0% of copper. Stability at high temperature is provided by 0.1–1.2% of manganese or 0.1–1% of zirconium. Furthermore, 0.1–5% of lead or 1.5–8% of silicon may be added.

BRIEF DESCRIPTION OF THE DRAWINGS

FIGS. 3A and 3B show measurement results of tensile strength at 20° C. and 175° C. respectively. FIG. 8 shows the results of measurement of fatigue obtained by Schenck fatigue tests. FIG. 9 shows the results of reciprocation load fatigue tests, and FIG. 10 shows the results of rotary load fatigue tests.

DETAILED DESCRIPTION OF THE PREFERRED EMBODIMENTS

Figure 1A:
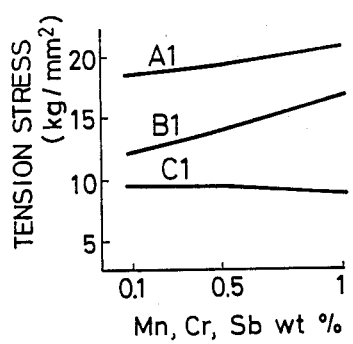
FIGS. 1A, 1B, 4A and 5A show results of the tests for tensile strength, fatigue strength and fatigue surface pressure of the aluminum bearing metal according to the first aspect of the present invention, the compositions of which are shown in Table 1.

In order to eliminate the foregoing disadvantage in the prior art, the inventors of the present application have found preferred combinations of the foregoing elements which are more effective than the various conventional combinations in realizing improvements in strength at a higher temperature, in seizure-resistance, and in fatigue strength.

Description will be made hereunder as to the composition of an aluminum bearing metal which is a feature of the present invention, according to several aspects of the invention.

According to a first aspect of the present invention, the aluminum bearing metal fundamentally consists, by percentage by weight, of 3–20% of Sn; 0.1–1.2% of Mn; 0.2–2% of Cu; and the remaining parts substantially consisting of Al. Further, if necessary, 0.1–5% by weight of Pb and 1.5–8% by weight of Si are added to the above-mentioned components. Alternatively, at least one of V, Nb, Mo, and Co is added to the above-mentioned components in place of or together with the above-mentioned Pb and Si, so that the additive quantity together with Mn falls within a range of from 0.1% exclusive to 1.2% by weight.

In the aluminum bearing metal according to the first aspect of the present invention, Sn is added for the principal purpose of providing lubrication. When the additive quantity of Sn is smaller than 3%, there exists no lubricating effect, and if it exceeds 20%, on the other hand, the whole metal becomes softened so as to reduce its load-resistance as well as its fatigue-resistance.

Further, the additive quantity of Mn is selected to be 0.1-1.2%. When the additive quantity is smaller than 0.1%, the improvement in strength at a high temperature can not be expected, and if it exceeds 1.2%, on the other hand, there is so much precipitation that the alloy is hardened too much for a bearing metal. The more preferable range of the additive quantity of Mn is 0.2-1.0%, and the most preferable one is 0.3-0.8%. The effects of maintenance of strength at a high temperature, a fine texture, and so on, due to the addition of Mn will be described later.

The additive quantity of Cu, according to the present invention, is selected to be 0.2-2%. The Cu is added in order to lessen the reduction in strength at a high temperature. When the additive quantity of Cu is smaller than 0.2%, the effect due to the addition of Cu is not expected so much, and on the other hand, if it exceeds 2%, the final bearing metal is hardened so much that not only the rolling property thereof is deteriorated but the corrosion-resistance thereof is reduce. A more preferable range of the additive quantity of Cu is 0.2-1.5%, and the most preferable range is 0.5-1.2%.

Silicon is added for the purpose of improving wear-resistance of the bearing metal, and the additive quantity of Si is selected to be within a range of 1.5-8%. When the additive quantity is smaller than 1.5%, the quantity of precipitation is so small that no effective improvement of the wear-resistance is seen, while if it exceeds 8%, on the contrary, the quantity of precipitation becomes so large that the rolling property of the bearing metal deteriorates to thereby make it difficult to repeatedly perform rolling and annealing operations, thus preventing the production of fine Sn crystallites. A more preferable range of the additive quantity of Sn is 1.5-5%, and the most preferable range is 2-4%.

Particularly, according to the first aspect of the present invention, Pb may be added, if necessary, in a quantity of 0.1-5% in order to improve the performance of Sn acting as lubricating metal. When the additive quantity of Pb is smaller than 0.1%, an effective improvement in lubrication property is not expected, while if it exceeds 5%, on the other hand, the bearing metal is softened so much that the fatigue-resistance is deteriorated.

Further, according to the present invention, at least one of V, Nb, Mo and Co is added as required in such a quantity that the total quantity of the thus added element or elements and Mn falls within a range of from 0.1% exclusive to 1.2%. That is, the additive quantity of the thus added element and elements selected from V, Nb, Mo and Co is selected to fall within a range of from a very small quantity to somewhat less than 1.2%. For purposes of this application, a very small quantity means 0.1% by weight or slightly more. The purpose of the addition of the foregoing element or elements is to increase the temperature of recrystallization of the Al support and to prevent the Al grain boundary from moving, as prevented by the intermetallic compounds of the foregoing metallic elements. When the total quantity of Mn and selected one of V, Nb, Mo and Co exceeds 1%, a large quantity of precipitation is disadvantageously generated which has a bad influence on the strength, the rolling property, and the fatique resistance of the bearing metal.

Next, description will be made as to the composition of the aluminum bearing metal according to a second aspect of the present invention.

The aluminum bearing metal, according to the present invention, fundamentally consists, by percentage by weight, of 3-20% of Sn; exclusive 0.2-1.2% of Mn; 0.2-2% of Cu; 1.5-8% of Si; and the remaining portion substantially consisting of Al. Further, if necessary, at least one of V, Nb, Mo, and Co is added with such an additive quantity that the total quantity of Mn and the V, Nb, Mo, and Co are within a range of from 0.2exclusive to 1.2%.

The contents of Sn and Cu according to the second aspect of the present invention are equal to those in the case of the first aspect of the present invention respectively.

In the aluminum bearing metal according to the second aspect of the present invention, the additive quantity of Mn is selected to be a value within a range of 0.2% exclusive to 1.2%. When the additive quantity is not larger than 0.2%, a significant improvement of strength at a high temperature is not expected. On the other hand, if it exceeds 1.2%, precipitation occurs to such an extent that the alloy is hardened too much for a bearing metal. A more preferable range of the additive quantity of Mn is 0.3-1.0% and the most preferable one is 0.4-0.8%. Description will be made later as to the maintenance of strength at a high temperature and as to the effect of making the structure fine due to the addition of Mn.

Further, Si is added for the purpose of improving wear-resistance, and the additive quantity thereof is 1.5-8%. When the additive quantity is smaller than 1.5%, the quantity of precipitation is so small that an effective improvement of the wear-resistance is not recognized, while if it exceeds 8%, on the other hand, the quantity of precipitation is so large that the rolling property of the hearing metal deteriorates, so that it becomes difficult to repeatedly perform rolling and annealing to thus prevent the Sn from being made fine. A more preferable range of the additive quantity of Si is 1.5-5%, and the most preferable one is 2-4%.

Silicon provides superior castability because of eutectic reaction, and the precipitated Si is so hard that the Vickers hardness thereof reaches about 1,000. Therefore, Si can remarkably decrease wear in a bearing of a shaft caused by sliding between the shaft and the bearing. When a bearing has a hardness lower than that of the shaft being used, the surface of the bearing is abraded. This state further progresses to thereby further roughen the bearing surface or to increase the clearance between the shaft and the bearing. A large clearance means that oil film is hardly formed between the bearing and the shaft. As a result, a direct contact of the shaft with the bearing, that is, metal contact, frequently occurs to cause seizure. The foregoing precipitation, however, is harder than a hardened steel shaft as well as a cast iron shaft, and therefore the addition of Si is particularly effective in an improvement of wear-resistance and seizure-resistance in the case of using a cast iron shaft.

As described above, essentially, Si is added in order to improve the seizure-resistance and the wear-resistance of a bearing, and particularly in order to improve the seizure-resistance of a bearing against a cast iron shaft. However, a very small quantity of all the Si has such an effect that the time for fine precipitation of Zr is shortened in heat treatment after worked. That is, it is necessary to perform aging treatment (heat treatment) at 450° C., for tens of hours or more in a dual system of Al-Zr, however, the heat treatment may be effected for 1 to several hours by the addition of Si to the dual system.

Further, according to the second aspect of the present invention, if necessary, at least one of V, Nb, Mo, and Co is added, the total additive quantity of each of Mn and of the V, Nb, Mo or Co being selected to be a value within a range of from 0.1% exclusive to 1.2%. That is, the additive quantity of the V, Nb, Mo, and Co is selected to be a value within a range of from a very small value to somewhat less than 1.2%.

The purpose of addition of the V, Nb, Mo, and Co is the same as that in the case of the first aspect of the present invention.

The aluminum bearing metal, according to a third aspect of the present invention, fundamentally consists, by weight percentage, of 3-20% of Sn; 0.1-1% of Zr; 1.5-8% of Si; 0.2-2% of Cu and/or Mg; and the residual portion of Al. If necessary, 0.1-5% by weight of Pb is added and, alternatively, at least one of Mn, V, Nb, Mo, and Co is added in place of or together with Pb, such that the total additive quantity of Zr and of Mn, V, Nb, Mo, and Co falls within a range of 0.1% exclusive to 1%.

In the aluminum bearing metal, according to the third aspect of the present invention, the content of Sn is selected to fall within a range of 3-20% which is equal to that of the aluminum bearing metal according to each of the first and second aspects, while the content of Si is selected to fall within a range of 1.5-8% which is equal to that in the aluminum bearing metal according to the second aspect. Also, the content of Pb, which may be required, is selected to fall within a range of 0.1-5% which is equal to that in the case of the first aspect.

Particularly, according to the third aspect of the present invention, Zr is added with the additive quantity within a range of 0.1-1%. When the additive quantity is not larger than 0.1%, an improvement of strength at a high temperature is not expected as described above, while if not smaller than 1%, precipitation is generated so much that the aluminum alloy is hardened too much as bearing metal.

The foregoing Zr is dissolved in solid solution in Al to thereby increase the temperature of recrystallization of the Al and to increase the hardness of the Al support. The hardness can be also increased by several rolling operations in comparison with the hardness obtainable in casting. The increase in recrystallization temperature of Al is effective in causing a bearing of an internal combustion engine to maintain a stable mechanical property of the engine even when exposed to a high temperature. The increased recrystallization temperature is particularly, effective in suppressing the reduction in hardness at high temperatures. Further, the precipitation of Zr generated over the limits of solid solution exists stably even at a high temperature. Therefore a fine dispersion of this compound provides a beneficial effect.

Further, with the foregoing precipitation existing in the Al support in the finely dispersed state, the intermetallic compound directly prevents a grain boundary of Al from moving, that is, it prevents Sn grains from enlarging, to thereby maintain the size of the Sn grains, which have been made fine by repeatedly performing rolling and annealing operations, so as to obtain the foregoing various effects. Similarly to this, the fact that the Sn grains exist in the Al support in the state where they are maintained small is effective in preventing a high temperature elution phenomenon of the Sn grains having a low melting point of 232° C.

It is known that Cr has the foregoing effects (as disclosed in Japanese Patent Unexamined Publication No. 87917/78). In the case of Cr, however, Sn begins to enlarge after 30 minutes at 450° C., while in the case of Zr, Sn is prevented from enlarging even at 500° C. for 30 minutes. It has been found that Zr has an effect superior to that of Cr from results of experiments which will be described later.

Next, the additive quantity of Cu and/or Mg is selected to fall within a range of 0.2-2%. The purpose of the addition of Cu and/or Mg is to suppress the reduction in strength at a high temperature. When the additive quantity is not larger than 1.5%, such a large effect as described above is not expected, while if it is not smaller than 2%, the alloy is hardened so much that its rolling property deteriorates and its corrosion-resistance is reduced.

This effect on the strength due to the addition of Cu and/or Mg is generated when Cu and/or Mg is added together with Zr. The increased strength at a high temperature is not expected by the addition of only Cu and/or Mg. That is, the increase in strength in rolling is remarkably large in the case where Cu and/or Mg is added to Al in comparison with the strength of an Al material in which any other element is added and the Al material is rolled at the same rolling rate. However, the aluminum alloy to which Cu and/or Mg is added is easily softened when it is heated to reach about 200° C., so that the maintenance of strength at a high temperature cannot be expected. In the case where Cu and/or Mg is added together with Zr, on the other hand, the strength which has been increased in rolling by the addition of the Cu and/or Mg is not reduced so much after annealing owing to the effect of addition of Zr. Therefore, a bearing metal having high strength is obtained, and this strength is never reduced so much even at a high temperature unlike the conventional alloy of this kind as described above.

Further, according to the present invention, if necessary, Pb is added to the aluminum alloy at 0.1-5% in order to improve performance of the Sn acting as a lubricating metal. Improved performance is seen when Pb is added together with Zr and Si. That is, when Pb alone is added, a melting point of the aluminum alloy is lowered because Sn in the Al-Sn alloy system forms an eutectic alloy is of Sn-Pb (having a melting point of 180° C.) and therefore the aluminum alloy exhibits fatigue characteristics.

When Zr, Si and Pb are together added, however, the texture of the eutectic alloy of Sn-Pb is made fine by the foregoing fine effect due to Zr. Therefore, the disadvantageous low melting point is compensated, so that the reduction in fatigue-resistance of the alloy is suppressed. Further the coefficient of friction of the alloy is easily stabilized to thereby remarkably improve its seizure-resistance.

Further, according the present invention, if necessary, at least one of Mn, V, Nb, Mo, and Co is added such that the total additive quantity of the Mn, V, Nb, Mo, and Co together with Zr is selected to fall within a range of from 0.1% exclusive to 1%. That is, the additive quantity of the Mn, V, Nb, Mo, and Co therefore falls within a range of from a small value to somewhat less than 1%.

The purpose of addition of the at least one of Mn, V, Nb, Mo, and Co is to increase the temperature of recrystallization in the Al support and these intermetallic compounds prevent a grain boundary of Al from moving.

When the total additive quantity of the at least one of Mn, V, Nb, Mo, and Co together with Zr exceeds 1%, a large quantity of precipitation is generated to deleteriously influence strength, rolling property, and fatigue of the alloy. Particularly, it has been found that if Sb is added, a large sized precipitation of AlSb is disadvantageously produced.

In order to confirm the effects in various combination of the elements described above, a variety of tests were performed with respect to the aluminum bearing metal according to the respective aspects of the present invention.

Tables 1 and 2 show compositions of various samples of the aluminum bearing metal according to the first and second aspects of the present invention respectively selected to have their tensile strengths compared with these of the comparative conventional samples.

TABLE 1

| Sample | | Al % | Sn % | Cu % | Pb % | Mn % | Cr % | Sb % |
|---|---|---|---|---|---|---|---|---|
| Invention | A1 | Bal. | 10 | 1 | 2.5 | 0.1 | — | — |
| | | Bal. | 10 | 1 | 2.5 | 0.5 | — | — |
| | | Bal. | 10 | 1 | 2.5 | 1 | — | — |
| Comparative | B1 | Bal. | 10 | 1 | 2.5 | — | 0.1 | — |
| | | Bal. | 10 | 1 | 2.5 | — | 0.5 | — |
| | | Bal. | 10 | 1 | 2.5 | — | 1 | — |
| | C1 | Bal. | 10 | 1 | 2.5 | — | — | 0.1 |
| | | Bal. | 10 | 1 | 2.5 | — | — | 0.5 |
| | | Bal. | 10 | 1 | 2.5 | — | — | 1 |

TABLE 2

| Sample | | Al % | Sn % | Cu % | Si % | Mn % | Cr % | Sb % |
|---|---|---|---|---|---|---|---|---|
| Invention | A2 | Bal. | 10 | 1 | 2.5 | 0.3 | — | — |
| | | Bal. | 10 | 1 | 2.5 | 0.5 | — | — |
| | | Bal. | 10 | 1 | 2.5 | 1.2 | — | — |
| Comparative | B2 | Bal. | 10 | 1 | 2.5 | — | 0.3 | — |
| | | Bal. | 10 | 1 | 2.5 | — | 0.5 | — |
| | | Bal. | 10 | 1 | 2.5 | — | 1.2 | — |
| | C2 | Bal. | 10 | 1 | 2.5 | — | — | 0.3 |
| | | Bal. | 10 | 1 | 2.5 | — | — | 0.5 |
| | | Bal. | 10 | 1 | 2.5 | — | — | 1.2 |

Figure 1B:
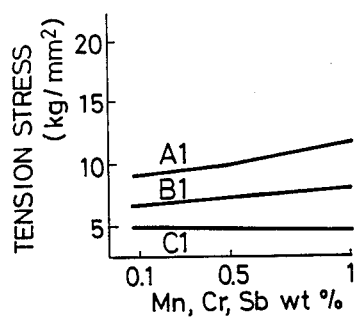
Figure 2A:
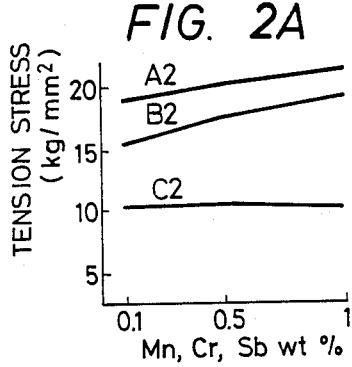
FIGS. 2A, 2B, 4B, and 5B show results of the tests for tensile strength, fatigue strength, and fatigue surface pressure of the aluminum bearing metal according to the second aspect of the present invention, the compositions of which are shown in Table 2.
Figure 2B:
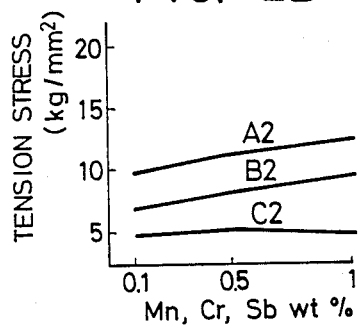

The tensile strength tests on the samples of aluminum bearing metal of Tables 1 and 2 were performed at 20° C. and 175° C. under the following conditions. FIGS. 1A and 1B show the results of tests as to the samples of the first aspect of the present invention and FIGS. 2A and 2B show the results of tests as to the second aspect of the present invention.

Condition of Test for Tensile Strength

Tester: Instron-type tension tester
Tensile speed: 5 mm/min
Test piece: JIS No. 6

Figure 4A:
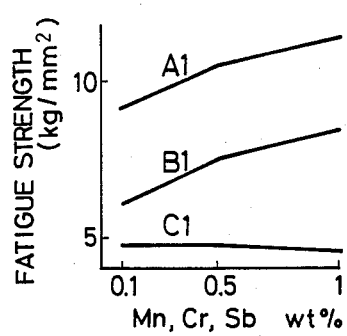
Figure 4B:
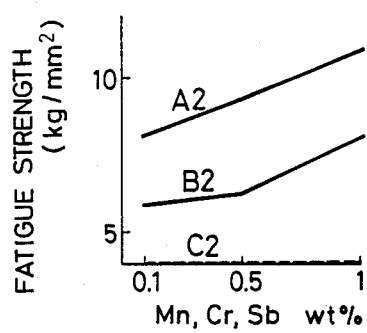

FIGS. 4A and 4B show the results of tests for fatigue strength for the aluminum bearing metal of the first and second aspects respectively of the present invention, performed under the following conditions.

Conditions of Tests for Fatigue Strength

Tester: Schenck-type Flat Plate Bending Tester
Fatigue strength is measured after $10^7$ cycles at 3000 cycles/min.

Atmospheric Temperature: 175±5° C.

Figure 5A:
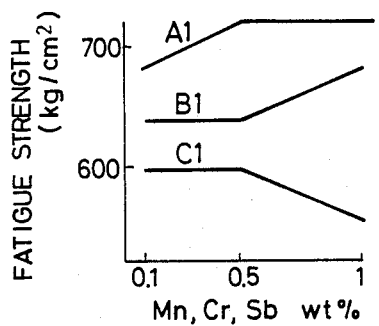
Figure 5B:
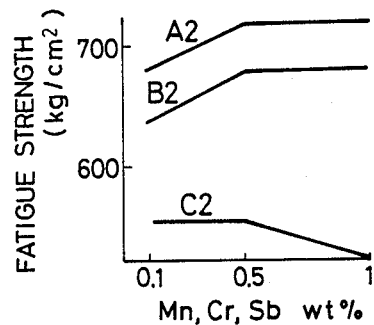

FIGS. 5A and 5B show the results of tests for fatigue surface pressure for the aluminum bearing metal of the first and second aspects of the present invention respectively, performed under the following conditions.

Conditions of Test for Fatigue Surface Pressure

Tester: Soda-type dynamic load tester
Revolutional speed: 2100–3100 r.p.m.
Shaft diameter: 40 mm
Shaft: S50C hardening (Hv 500–600)
Lubricating oil: SAE 10W-30
Oil temperature: 140±5° C.
Fatigue strength is measured after $10^7$ cycles.

Figure 6A:
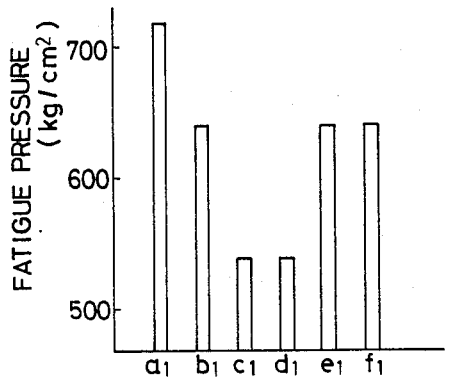
FIGS. 6A and 7A, and FIGS. 6B and 7B show results of the tests for fatigue and seizure surface pressure of the aluminum bearing metal, the compositions of which are shown in Tables 3 and 4, respectively.
Figure 6B:
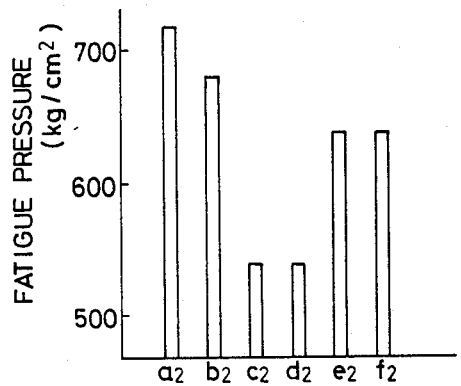
Figure 7A:
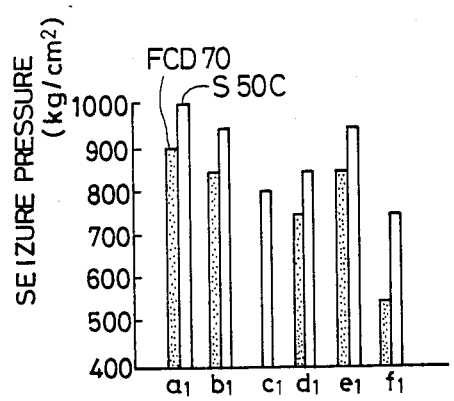
Figure 7B:
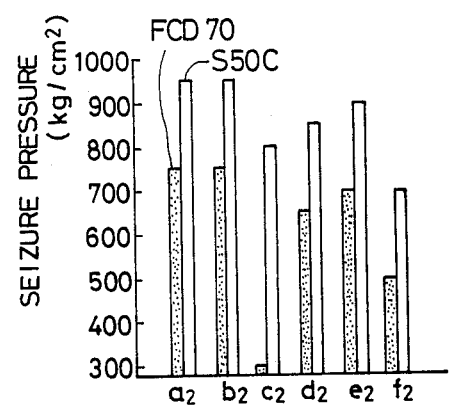

Furthermore, tests for fatigue surface pressure and for seizure surface pressure were performed on the aluminum bearing metal according to the first and second aspects of the present invention which are shown in Tables 3 and 4 respectively. FIGS. 6A and 7A show the results of tests for the first aspect of the present invention, and FIGS. 6B and 7B show the results of tests for the second aspect of the present invention.

The compositions of the aluminum bearing metals used in these test are shown in Table 3 for the first aspect of the invention and those for the second aspect in Table 4.

TABLE 3

| Sample | | Al % | Sn % | Cu % | Pb % | Si % | Mn % | Cr % | Sb % |
|---|---|---|---|---|---|---|---|---|---|
| Invention | a1 | Bal. | 12 | 1 | 2.5 | 2.5 | 0.5 | — | — |
| | b1 | Bal. | 4 | 1 | 2.5 | 4 | 0.1 | — | — |
| Comparative | c1 | Bal. | 12 | 1 | 2.5 | — | 0.5 | — | 2 |
| | d1 | Bal. | 12 | 1 | 2.5 | 2.5 | 0.5 | 0.5 | 2 |
| | e1 | Bal. | 12 | 1 | 2.5 | 2.5 | — | 0.5 | — |
| | f1 | Bal. | 4 | 1 | 0.05 | 4 | 0.1 | — | — |

TABLE 4

| Sample | | Al % | Sn % | Cu % | Si % | Mn % | Cr % | Sb % |
|---|---|---|---|---|---|---|---|---|
| Invention | a2 | Bal. | 12 | 1 | 2.5 | 0.5 | — | — |
| | b2 | Bal. | 4 | 1 | 4 | 2.5 | — | — |
| Comparative | c2 | Bal. | 12 | 1 | — | 0.5 | — | 2 |
| | d2 | Bal. | 12 | 1 | 2.5 | 0.5 | 0.5 | 2 |
| | e2 | Bal. | 12 | 1 | 2.5 | — | 0.5 | — |
| | f2 | Bal. | 4 | 1 | 4 | 0.1 | — | — |

The conditions for the tests for fatigue surface pressure of FIGS. 6A and 6B are the same as those for the tests of FIGS. 5A and 5B. On the other hand, the conditions for the tests for seizure surface pressure of FIGS. 7A and 7B are as follows.

Conditions of Tests for Seizure Surface Pressure

Tester: Journal-type seizure tester
Revolutional speed: 1,000 r.p.m.
Shaft diameter: 52 mm
Shaft: FCD 70 (Hv 230–250) defined by JIS S50C hardening (Hv 500–600) defined by JIS
Lubricating oil: SAE 10W-30
Oil temperature: 140±5° C.
Load: Load is increased by 50 kg/cm² every 30 minutes.

From FIGS. 1 through 7, it can be recognized that the aluminum bearing metal according to the first and second aspects of the present invention are more effective in tensile strength, fatigue strength, and fatigue surface pressure at a high temperature than those of the aluminum bearing metal of the comparative materials.

From FIGS. 1 through 5, it can be recognized that a bearing containing Mn is more effective in tensile strength, fatigue strength, and fatigue surface pressure at a high temperature than those containing Cr and Sb.

This reason for this increased high temperature strength will be described in detail hereunder.

Manganese is dissolved in solid solution in Al to thereby increase the temperature of recrystallization of Al and to increase the hardness of the Al support. Also, the hardness is increased by several rolling operations in comparison with that available in casting. The increase in recrystallization temperature of Al is effective to cause a bearing of an internal combustion engine to maintain a stable mechanical property of the engine even when exposed to a high temperature. It is particularly effective in suppressing the reduction in hardness at a high temperature to thereby improve the strength of bearing at a high temperauture. Further, the precipitates of the intermetallic compounds of Al-Mn generated over the limits of solid solubility exists stably even at a high temperature. Therefore a fine dispersion of these precipitates contributes to the elevation of the recrystallization temperature and the maintenance of the hardness of the bearing at a high temperature. Thus, suitable dispersion of this precipitation provides a beneficial effect.

Further, since the foregoing precipitation exists in the Al support in the finely dispersed state, the intermetallic compound directly prevents a grain boundary state, the intermetallic compound directly prevents a grain boundary of Al from moving, that is, it prevents Sn grains from enlarging. The precipitation thereby maintains the small size of the Sn grains, which have been made small by repeated rolling and annealing operations so as to obtain the foregoing various effects. Similarly to this, the fact that the Sn grains exist in the Al support in the state where they are maintained at small size is effective in preventing a high temperature elution phenomenon of the Sn grains having a low melting point of 232° C.

It has been found that, although Cr has more or less a similar effect, the Sn grains begin to enlarge at 450° C. for 30 minutes in the case of Cr. On the other hand, Sn grains are prevented from enlarging even at 500° C. for 30 minutes in the case of Mn. Therefore, Mn has an effect superior to that of Cr as can also be seen from the results of experiments which will be described later.

Further, if Sb is added, a large quantity of precipitation of AlSb is generated. Therefore it has been found that the addition of Sb provides a deleterious influence on strength, rolling property, and fatigue of the alloy, so that Sb has no effect on an improvement of tensile and fatigue strength.

This effect on the strength due to the addition of Cu is generated when Cu is added together with Mn, and the effect of increase in strength at a high temperature is not expected by the addition of only Cu. That is, the increase in hardness by rolling is remarkably large in the case where Cu is added to Al in comparison with that of an Al material in which any other element is added when the Al materials are rolled at the same rolling rate. However, the aluminum alloy to which Cu without Mn is added is easily softened when it is heat to about 200° C., so that the maintenance of strength at high temperatures cannot be expected. In the case where Cu is added together with Mn, on the other hand, the hardness which has been increased by rolling by the addition of the Cu is not reduced so much after annealing owing to the effect of the additional Mn. Therefore, an aluminum bearing metal having high strength is obtained, and, as described above, this strength is not reduced so much, even at a high temperature, unlike the conventional alloy of this kind.

Further, the effect of Pb for improving the lubricating property is increased still more when Pb is added together with Mn. That is, when Pb alone is added to a bearing metal of an alloy of the Al-Sn system, Sn in the Al-Sn alloy is alloyed to form an eutectic alloy of Pb-Sn to thereby inevitably cause the disadvantage that the melting point of the alloy is reduced. When Mn is added to the alloy to thereby maintain the small size of the Sn grains and to maintain the texture of Sn in the state where it is made granularly small at high temperatures, on the other hand, it is possible to improve the lubricating property and fatigue-resistance without producing the foregoing disadvantage even when Pb is added.

From FIGS. 6A, 6B, 7A and 7B, it can be recognized that the aluminum bearing metal according to the present invention is more effective against fatigue and seizure surface pressure than those bearing metals of the comparative materials. This reason will be described in detail hereunder.

Si is superior in castability because of eutectic reaction, and the precipitates of Si are so hard that its Vicker's hardness reaches about 1,000. Therefore, Si can remarkably decrease wear in a bearing of a shaft caused by sliding between the shaft and the bearing. When a bearing has a hardness lower than that of a shaft being used, the surface of the bearing is abraded and this abrasion continues to thereby further roughen the bearing surface or to increase the clearance between the shaft and the bearing so that oil film is hardly therebetween. As a result, the shaft may directly conduct the bearing, that is, there may be a frequent occurrence of metal contact which may cause seizure. The foregoing precipitation, however, is harder than a hardened steel shaft as well as a cast iron shaft. Therefore, the addition of Si is particularly effective in improving wear-resistance and seizure-resistance when a cast iron shaft is used.

As described above, Si can improve the seizure-resistance and the wear-resistance of a bearing, and can particularly improve the seizure-resistance of a bearing against a cast iron shaft.

Further, when Si and Mn are added together, the shape of the Si is apt to be made relatively round by rolling and annealing operations performed repeatedly thereafter. A diameter of the precipitate is apt to slightly enlarge to thereby more effectively improve the seizure-resistance and the wear-resistance.

Further, if Mn, Si and Pb are added together, the texture of the eutectic alloy of Sn-Pb is made fine by the foregoing fine effect due to Mn. Therefore, the disadvantageous low melting point is compensated, so that the reduction in fatigue-resistance of the allow is suppressed. Further the coefficient of friction of the alloy is easily stabilized to thereby remarkably improve its seizure-resistance.

Next, illustrated embodiments according to the present invention will be described. Tensile strength tests, seizure surface pressure tests, and various fatigue tests were performed on the aluminum bearing metal, the compositions of which are shown in Tables 5 through 7. Also the results of tests are shown in the same Tables 5 through 7.

Tables 5a and 5b, show the compositions results of tests for the aluminum bearing metal according to the first aspect of the present invention; Table 6 shows them according to the second aspect; and Tables 7a through 7c show them according the third aspect.

In Tables 5a and 5b, samples 1–10, 16–26, 31–42, and 48–55 are materials for the aluminum bearing metal according to the first aspect of the present invention. On the other hand, samples 11–15, 27–30, 43–47, and 56–59 are comparative materials.

In Table 6, samples 1–10, and 16–25 are the materials for the aluminum bearing metal according to the second aspect of the present invention, and, on the other hand, samples 11–15, and 26–29 are comparative materials.

The samples of Tables 1 through 6 were prepared as follows. An Al support was melted in a gas furnace, an Al-Cu mother alloy, an Al-Mn mother alloy, an Al-Si mother alloy, an Al-V mother alloy, an Al-Nb mother ally, an Al-Mo mother alloy, an Al-Co mother alloy, and an Al-Cr mother alloy were melted in accordance with target compositions. Venting treatment was performed with respect to the thus obtained materials after addition of Sn, Pb, and Sb. The materials were cast into metal molds. Rolling and annealing were repeatedly performed several times on the materials so as to obtain samples. The thus obtained samples were subjected to the tension strength tests. Thereafter, the samples were further rolled and then these alloys were pressure-welded with back metal steel plates to form bi-metal materials. The bi-metal materials were worked so as to obtain slip bearings after annealing. The plane bearings were subject to seizure surface pressure tests and various fatigue tests.

It is true of course that impurities which by all means are inevitable by ordinary refining techniques are contained in the alloy compositions according to the present invention.

A variety of test conditions for the foregoing tests for the samples of Tables 5a and 5b are the same as those of FIGS. 1 through 7 in except the following conditions for fatigue tests.

Schenck Fatigue Test

Schenck-type flat plate bending tester
Fatigue strength is measured after $10^7$ bending flexes at 3,000 cycles/min.
Atmospheric temperature 175±5° C.

Alternating Load Fatigue Test

Soda dynamic load tester
Revolutional speed: 2,100–3,100 r.p.m.
Shaft diameter: 40 mm
Shaft: S50C hardening ($H_v$500–600)
Lubricating oil: SAE 10W-30
Oil temperature: 140±5° C.
Load: 40 kg/cm$^2$
Fatigue strength is measured after $10^7$ loading cycles.

Rotating Load Fatigue Test

Rotating load tester
Revolutional speed: 8,000 r.p.m.
Surface pressure: 300 kg/cm$^2$
Shaft diameter: 40 mm
Shaft: S50C hardening ($H_v$500–600)
Lubricating oil: SAE 10W-30
Oil temperature: 120°–160° C.
The limiting temperature is measured on the back surface of the bearing which can withstand $10^7$ test cycles.

From the test results of Tables 5a and 5b, it can be recognized that the aluminum bearing metal according to the first aspect of the present invention is more effective than that using the comparative materials.

Particularly, as to tensile strength, a remarkable difference appears when the oil temperature rises up to 175° C., while there is no remarkable difference at the oil temperature of 20° C. Therefore, it can be understood that strength can be sufficiently maintained even at a high temperature by addition of Mn and Cu.

Further, in the seizure tests, a remarkable difference could be recognized in the case of using the FCD70 shaft even with respect to the samples which shown no remarkable difference when the S50C shaft was used. Particularly, for the samples containing Si, it can be recognized that there is a large effect on a cast iron shaft.

Further, in the fatigue tests by means of the Schenck flat plate bending tester, the Soda dynamic load tester, more remarkable differences could be recognized between the alloy materials according to the present invention and the comparative materials.

The tests were not performed with respect to the samples of which test results are not shown in Tables 5a and 5b.

Various test conditions for the foregoing tests for the samples of Table 6 are the same as those for the first aspect of the present invention.

From the test results of Table 6, it can be recognized that the aluminum bearing metal according to the second aspect of the present invention produces excellent results in the tensile strength tests, the seizure surface pressure tests and fatigue tests in comparison with the results of the comparative materials.

Figure 3A:
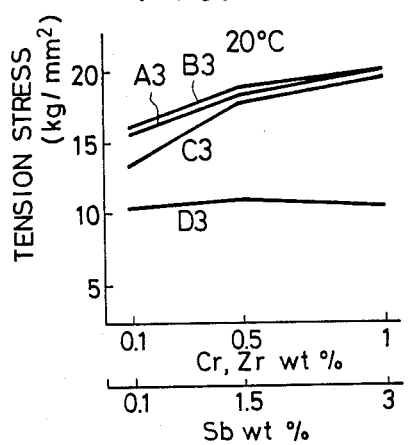
FIGS. 3A and 3B and FIGS. 8 through 10 shows results of tests when the compositions of sample A3, B3, C3, and D3 are changed. A3 represents the samples 36–38 according to the present invention, B3 represents the samples 39–41 according to the present invention, C3 represents the samples 42–44 of the comparative materials, and D3 represents the samples 45–47 of the comparative materials in Table 7b.
Figure 3B:
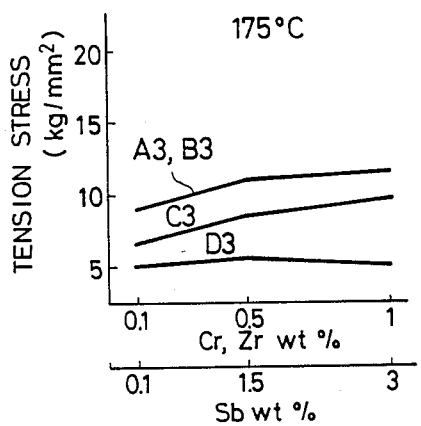
Figure 8:
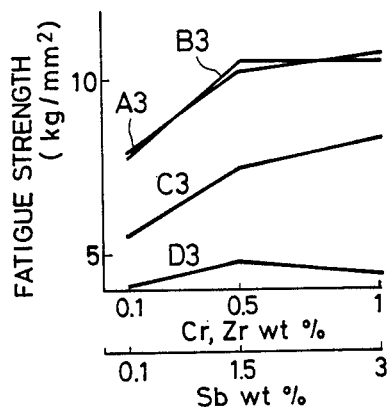
Figure 9:
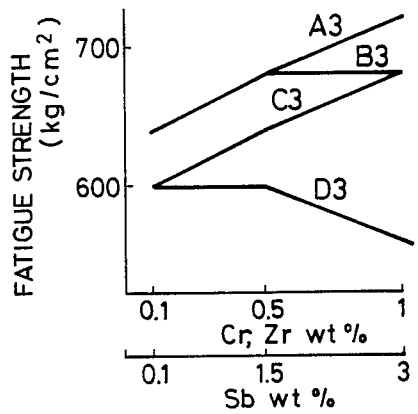
Figure 10:
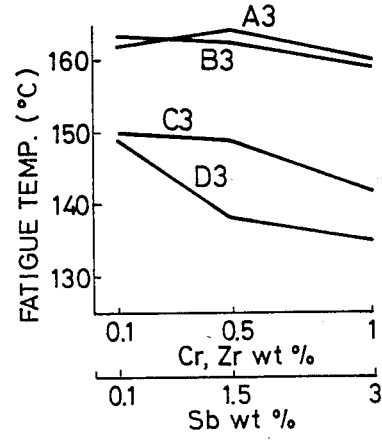

FIGS. 3A and 3B and FIGS. 8 through 10 show results of tests when the compositions of samples A3, B3, C3, and D3 of Table 7b are changed. A3 represents the samples 36–38 according to the present invention; B3 represents the samples 39–41 according to the present invention; C3 represents the samples 42–44 of the comparative materials, and D3 represents the samples 45–47 of the comparative materials. FIGS. 3A and 3D show measurement results of tensile strength at 20° C. and 175° C. respectively. FIG. 8 shows the results of measurement of fatigue obtained by Schenck fatigue tests after $10^7$ cycles, FIG. 9 shows the results of reciprocation load fatigue tests after $10^7$ cycles, and FIG. 10 shows the results of rotary load fatigue tests after $10^7$ cycles. Further, in the foregoing typical examples, substantial differences could not be seen in the results of seizure tests.

Various tests were performed under the same conditions as the foregoing ones in the case of the first and second aspects of the present invention.

As seen from the results of tests in Tables 7a and 7b, the materials according to the present invention provide better results than those of the comparative materials.

Particularly, as is apparent from the results of tests in FIGS. 3A and 3B, and FIGS. 8 through 10, the samples A3 and B3 (samples 36–38 and 39–41) containing Zr according to the present invention show better results than those of the comparative samples C3 and D3 (samples 42–44 and 45–47) containing Cr and Sb, respectively, in place of Zr. Further, as for the materials containing no Pb among the foregoing samples A3 through D3, the same results as described above were obtained except for the seizure surface pressure tests.

As described above, in the aluminum bearing metal, according to the present invention, it is possible to improve strength at a high temperature and seizure-resistance and to increase fatigue strength in comparison with the conventional materials.

TABLE 5

| | | Al | Sn | Cu | Mn | Pb | Si | V | Nb | Mo | Co | Cr | Sb | Tensile strength kg/cm² 20° C. | Tensile strength kg/cm² 175° C. | Seizure surface pressure kg/cm² PCD70 shaft | Seizure surface pressure kg/cm² S50C shaft | Fatigue test Schenck | Fatigue test Alternating load | Fatigue test Rotating load |
|---|---|---|---|---|---|---|---|---|---|---|---|---|---|---|---|---|---|---|---|---|
| Material of Invention | 1 | Bal. | 3 | 1 | 0.8 | — | — | — | — | — | — | — | — | 21.0 | 11.8 | — | 750 | 10.8 | 720 | 165 |
| | 2 | Bal. | 5 | 0.2 | 1.2 | — | — | — | — | — | — | — | — | 18.3 | 10.0 | — | 800 | 8.8 | 680 | — |
| | 3 | Bal. | 7 | 0.5 | 0.6 | — | — | — | — | — | — | — | — | 18.2 | 10.0 | — | 800 | 8.6 | 680 | 160 |
| | 4 | Bal. | 7 | 2 | 0.1 | — | — | — | — | — | — | — | — | 19.7 | 10.2 | — | 800 | 9.2 | 680 | — |
| | 5 | Bal. | 7 | 1.5 | 0.4 | — | — | — | — | — | — | — | — | 19.2 | 10.2 | — | 800 | 9.0 | 680 | 162 |
| | 6 | Bal. | 10 | 1.2 | 0.8 | — | — | — | — | — | — | — | — | 21.3 | 11.9 | — | 850 | 10.8 | 720 | 162 |
| | 7 | Bal. | 10 | 1 | 1 | — | — | — | — | — | — | — | — | 21.1 | 12.1 | — | 850 | 11.0 | 720 | 158 |
| | 8 | Bal. | 15 | 2 | 0.2 | — | — | — | — | — | — | — | — | 20.6 | 11.4 | — | 850 | 10.4 | 680 | — |
| | 9 | Bal. | 18 | 1.8 | 0.5 | — | — | — | — | — | — | — | — | 20.6 | 11.6 | — | 850 | 10.5 | 680 | 160 |
| | 10 | Bal. | 20 | 0.8 | 1.2 | — | — | — | — | — | — | — | — | 20.2 | 11.2 | — | 900 | 10.3 | 720 | — |
| Comparative Material | 11 | Bal. | 17 | 0.8 | 1 | — | — | — | — | — | — | — | 2 | 17.6 | 8.4 | — | 900 | 7.8 | 640 | 147 |
| | 12 | Bal. | 12 | 0.5 | — | — | — | — | — | — | — | 0.3 | — | 14.5 | 7.2 | — | 800 | 7.0 | 640 | 145 |
| | 13 | Bal. | 20 | 1 | — | — | — | — | — | — | — | — | — | 10.5 | 4.0 | — | 850 | 4> | 560 | 152 |
| | 14 | Bal. | 6 | 0.8 | 3 | — | — | — | — | — | — | — | 1 | 20.8 | 7.8 | — | 750 | 7.6 | 560 | 130> |
| | 15 | Bal. | 10 | 0.5 | — | — | — | — | — | — | — | — | 4 | 15.2 | 6.8 | — | 800 | 5.8 | 560> | 140 |
| Material of Invention | 16 | Bal. | 3 | 0.8 | 0.6 | 3 | — | — | — | — | — | — | — | 19.4 | 10.8 | — | — | 9.8 | 720 | — |
| | 17 | Bal. | 4 | 0.2 | 1.2 | 1.5 | — | — | — | — | — | — | — | 18.3 | 9.3 | — | — | 8.3 | — | 156 |
| | 18 | Bal. | 6 | 1 | 0.2 | 0.1 | — | — | — | — | — | — | — | 16.4 | 9.0 | — | — | 8.1 | 680 | 158 |
| | 19 | Bal. | 8 | 1.5 | 0.1 | 0.5 | — | — | — | — | — | — | — | 19.0 | 10.0 | — | — | 9.0 | — | 156 |
| | 20 | Bal. | 10 | 0.5 | 1 | 4 | — | — | — | — | — | — | — | 19.1 | 10.3 | — | — | 9.2 | 720 | — |
| | 21 | Bal. | 12 | 1 | 0.8 | 0.8 | — | — | — | — | — | — | — | 20.8 | 11.6 | — | — | 10.5 | 720 | 160 |
| | 22 | Bal. | 12 | 1.2 | 0.4 | 1.5 | — | — | — | — | — | — | — | 18.9 | 9.7 | — | — | 8.6 | — | 162 |
| | 23 | Bal. | 15 | 2 | 0.3 | 0.3 | — | — | — | — | — | — | — | 20.2 | 11.0 | — | — | 10.1 | 680 | — |
| | 24 | Bal. | 17 | 1.8 | 0.5 | 2 | — | — | — | — | — | — | — | 20.3 | 11.3 | — | — | 10.2 | — | 160 |
| | 25 | Bal. | 18 | 0.4 | 1 | 1 | — | — | — | — | — | — | — | 19.0 | 10.2 | — | — | 9.2 | — | 158 |
| | 26 | Bal. | 20 | 0.7 | 0.4 | 3.5 | — | — | — | — | — | — | — | 18.2 | 9.1 | — | — | 8.0 | 640 | 162 |
| Comparative Material | 27 | Bal. | 12 | 0.7 | 1 | 3 | — | — | — | — | — | — | 3 | 15.5 | 8.2 | — | — | 7.2 | 600 | 140 |
| | 28 | Bal. | 18 | 1 | — | 2 | — | — | — | — | — | 0.2 | — | 13.8 | 7.0 | — | — | 6.8 | 640 | 148 |
| | 29 | Bal. | 10 | 0.8 | 4 | 1.5 | — | — | — | — | — | — | 2 | 18.8 | 7.3 | — | — | 6.4 | 560> | 130> |
| | 30 | Bal. | 20 | 1 | 0.2 | 3 | — | — | — | — | — | — | 5 | 14.2 | 5.8 | — | — | 5.2 | 560> | 130> |
| Material of Invention | 31 | Bal. | 3 | 0.2 | 0.8 | 2 | 3 | — | — | — | — | — | — | 18.5 | 10.5 | 850 | 900 | 8.5 | 640 | 155 |
| | 32 | Bal. | 5 | 1 | 0.6 | 0.5 | 2 | — | — | — | — | — | — | 20.7 | 11.5 | 800 | 800 | 10.5 | 720 | 163 |
| | 33 | Bal. | 5 | 1.8 | 0.1 | 1.5 | 1.5 | — | — | — | — | — | — | 20.0 | 11.8 | 850 | 900 | 10.8 | 640 | 155 |
| | 34 | Bal. | 8 | 0.4 | 1.2 | 0.1 | 8 | — | — | — | — | — | — | 19.6 | 10.6 | 850 | 850 | 9.4 | — | 153 |
| | 35 | Bal. | 8 | 0.8 | 0.5 | 3.5 | 4.5 | — | — | — | — | — | — | 19.4 | 10.2 | 900 | 1050 | 9.2 | 680 | 160 |
| | 36 | Bal. | 10 | 1 | 0.6 | 1.8 | 2.5 | — | — | — | — | — | — | 20.5 | 11.3 | 900 | 1000 | 10.5 | 720 | 162 |
| | 37 | Bal. | 10 | 0.5 | 1 | 1 | 3.5 | — | — | — | — | — | — | 19.5 | 10.5 | 900 | 950 | 9.5 | 680 | 156 |
| | 38 | Bal. | 12 | 1.2 | 0.1 | 5 | 1.8 | — | — | — | — | — | — | 19.0 | 10.0 | 900 | 1000 | 8.7 | — | 154 |
| | 39 | Bal. | 12 | 0.6 | 0.8 | 3 | 6 | — | — | — | — | — | — | 19.2 | 10.1 | 900 | 900 | 9.1 | 640 | 158 |
| | 40 | Bal. | 15 | 1.5 | 0.3 | 0.8 | 3 | — | — | — | — | — | — | 19.3 | 10.0 | 900 | 950 | 9.1 | 680 | 160 |
| | 41 | Bal. | 18 | 2 | 0.4 | 2 | 2 | — | — | — | — | — | — | 20.8 | 10.6 | 950 | 1050 | 9.6 | 680 | — |
| | 42 | Bal. | 20 | 0.2 | 0.9 | 1.5 | 4 | — | — | — | — | — | — | 19.0 | 10.7 | 1050 | 1100 | 8.8 | 640 | 152 |
| Comparative Material | 43 | Bal. | 12 | 0.8 | 2.5 | 1.5 | 2.5 | — | — | — | — | 0.2 | — | 20.3 | 9.7 | 750 | 850 | 7.2 | 560 | 132 |
| | 44 | Bal. | 17 | 0.7 | 3.5 | 1.5 | 4.5 | — | — | — | — | — | 0.8 | 22.1 | 7.1 | 750 | 850 | 6.2 | 560> | 130> |
| | 45 | Bal. | 17 | 0.7 | 0.5 | 1.5 | 2 | — | — | — | — | — | 5 | 17.2 | 6.9 | 750 | 800 | 5.2 | 560> | 130 |
| | 46 | Bal. | 17 | 0.7 | — | 1.5 | 1.5 | — | — | — | — | — | 1 | 12.5 | 5.5 | 550 | 850 | 6.5 | 560 | 140 |
| | 47 | Bal. | 4 | 1 | 0.1 | — | 4 | — | — | — | — | — | — | 14.5 | 6.2 | 650 | 800 | 8.2 | 600 | 150 |
| Material of Invention | 48 | Bal. | 3 | 0.8 | 0.1 | — | — | 0.5 | — | 0.1 | — | — | — | 19.5 | 10.3 | — | 850 | 9.3 | 680 | 160 |
| | 49 | Bal. | 5 | 0.2 | 0.8 | 1.5 | 2.5 | 0.1 | — | — | — | — | — | 19.0 | 10.0 | — | 900 | 9.0 | 680 | 154 |
| | 50 | Bal. | 8 | 2 | 0.2 | 3 | 1.5 | — | 0.1 | 0.1 | — | — | — | 21.0 | 10.7 | — | 900 | 9.5 | 680 | 158 |
| | 51 | Bal. | 10 | 1.2 | 0.2 | 5 | — | 0.1 | — | — | 0.2 | — | — | 18.8 | 9.6 | — | 900 | 8.8 | 640 | 153 |
| | 52 | Bal. | 12 | 1 | 0.1 | — | — | 0.3 | — | — | — | — | — | 19.7 | 10.4 | — | 850 | 9.5 | 640 | 158 |
| | 53 | Bal. | 15 | 0.5 | 0.5 | 0.1 | 7 | 0.1 | 0.1 | 0.1 | 0.1 | — | — | 20.8 | 11.6 | — | 850 | 10.6 | 640 | 148 |
| | 54 | Bal. | 18 | 1.5 | 0.3 | — | — | — | — | — | 0.1 | — | — | 18.6 | 9.4 | — | 850 | 8.5 | 680 | 160 |
| | 55 | Bal. | 20 | 1 | 0.1 | 2 | — | 0.1 | 0.1 | — | — | — | — | 18.3 | 9.0 | — | 1050 | 8.2 | 640 | 150 |
| Comparative Material | 56 | Bal. | 16 | 0.5 | 2 | — | 3 | 2 | — | — | — | 0.8 | 2 | 22.0 | 9.0 | — | 850 | 6.8 | 560> | 130 |
| | 57 | Bal. | 15 | 1 | 2 | 1 | 3 | — | 2 | — | — | 0.2 | — | 19.8 | 10.5 | — | 850 | 6.6 | 560 | 132 |
| | 58 | Bal. | 12 | 0.8 | 3 | 2 | — | 3 | — | — | — | — | 1 | 20.6 | 8.3 | — | 850 | 6.8 | 560> | 130> |
| | 59 | Bal. | 12 | 0.8 | 0.8 | 2 | 1.5 | — | 0.1 | — | — | — | 4 | 16.3 | 7.0 | — | 900 | 5.8 | 560> | 130> |

TABLE 6

| | | Al | Sn | Cu | Mn | Si | V | Nb | Mo | Co | Cr | Sb | Tensile strength kg/cm² 20° C. | Tensile strength kg/cm² 175° C. | Seizure surface pressure kg/cm² FCD70 shaft | Seizure surface pressure kg/cm² S50C shaft | Fatigue test Schenck | Fatigue test Alternating load | Fatigue test Rotating load |
|---|---|---|---|---|---|---|---|---|---|---|---|---|---|---|---|---|---|---|---|
| Material | 1 | Bal. | 3 | 1 | 1 | 3.5 | — | — | — | — | — | — | 21.8 | 12.6 | 700 | 750 | 11.5 | 720 | — |

TABLE 6-continued

| | | Al | Sn | Cu | Mn | Si | V | Nb | Mo | Co | Cr | Sb | | Tensile strength kg/cm² 20° C. | Tensile strength kg/cm² 175° C. | Seizure surface pressure kg/cm² FCD70 shaft | Seizure surface pressure kg/cm² S50C shaft | Fatigue test Schenck | Fatigue test Alternating load | Fatigue test Rotating load |
|---|---|---|---|---|---|---|---|---|---|---|---|---|---|---|---|---|---|---|---|---|
| of | 2 | Bal. | 5 | 0.2 | 0.4 | 8 | — | — | — | — | — | — | | 19.6 | 10.4 | 800 | 850 | 9.5 | 640 | 152 |
| Invention | 3 | Bal. | 6 | 0.8 | 0.25 | 1.5 | — | — | — | — | — | — | | 18.5 | 9.2 | 650 | 850 | 8.3 | 680 | — |
| | 4 | Bal. | 8 | 2 | 0.3 | 2 | — | — | — | — | — | — | | 20.5 | 11.3 | 650 | 850 | 10.2 | 720 | 158 |
| | 5 | Bal. | 8 | 1.2 | 0.6 | 2.5 | — | — | — | — | — | — | | 19.3 | 10.1 | 650 | 900 | 9.1 | 720 | 163 |
| | 6 | Bal. | 10 | 0.4 | 1.2 | 5 | — | — | — | — | — | — | | 19.4 | 10.2 | 700 | 950 | 9.1 | 680 | — |
| | 7 | Bal. | 12 | 1.5 | 0.25 | 1.8 | — | — | — | — | — | — | | 18.8 | 9.6 | 700 | 900 | 8.7 | 640 | 158 |
| | 8 | Bal. | 12 | 0.8 | 1 | 3 | — | — | — | — | — | — | | 21.4 | 12.4 | 750 | 950 | 11.4 | 680 | 155 |
| | 9 | Bal. | 17 | 0.3 | 0.5 | 4 | — | — | — | — | — | — | | 20.2 | 11.0 | 800 | 950 | 10.2 | 640 | — |
| | 10 | Bal. | 20 | 0.7 | 0.8 | 1.5 | — | — | — | — | — | — | | 20.7 | 11.5 | 800 | 900 | 10.4 | 680 | 157 |
| Com- | 11 | Bal. | 4 | 1 | 0.1 | 4 | — | — | — | — | — | — | | 14.5 | 6.2 | 650 | 800 | 8.2 | 600 | 150 |
| parative | 12 | Bal. | 4 | 1 | — | 4 | — | — | — | — | — | — | | 13.5 | 5.0 | 650 | 800 | 4.6 | 560 | 145 |
| Material | 13 | Bal. | 15 | 0.7 | 4 | 4 | — | — | — | — | 0.8 | — | | 19.3 | 7.5 | 650 | 850 | 6.0 | 560> | 130> |
| | 14 | Bal. | 15 | 0.7 | 0.6 | 1.5 | — | — | — | — | 4 | — | | 15.8 | 6.0 | 650 | 800 | 5.4 | 560> | 130> |
| | 15 | Bal. | 6 | 1 | — | 1.5 | — | — | — | — | — | — | Ni0.4 | 17.5 | 7.5 | 350 | 500 | 6.3 | Seizure | Seizure |
| Material | 16 | Bal. | 3 | 1.4 | 0.9 | 4 | 0.1 | — | — | — | — | — | | 20.7 | 11.5 | 700 | 750 | 10.3 | 680 | — |
| of | 17 | Bal. | 5 | 1 | 0.4 | 3 | — | 0.2 | — | — | — | — | | 20.9 | 11.6 | 800 | 850 | 10.3 | 680 | 161 |
| Invention | 18 | Bal. | 5 | 1.5 | 0.2 | 1.5 | 0.1 | — | 0.1 | 0.1 | — | — | | 21.1 | 11.9 | 650 | 800 | 10.8 | 680 | 155 |
| | 19 | Bal. | 7 | 0.8 | 0.5 | 2.5 | 0.2 | 0.1 | — | — | — | — | | 20.8 | 11.5 | 700 | 850 | 10.3 | 720 | 153 |
| | 20 | Bal. | 8 | 0.2 | 0.8 | 8 | — | — | 0.1 | — | — | — | | 20.5 | 11.3 | 850 | 850 | 10.1 | 640 | — |
| | 21 | Bal. | 10 | 2 | 0.2 | 2 | — | 0.1 | 0.1 | — | — | — | | 21.6 | 12.2 | 850 | 950 | 11.2 | — | 156 |
| | 22 | Bal. | 10 | 0.5 | 0.4 | 6 | — | — | 0.1 | 0.1 | — | — | | 19.0 | 10.6 | 900 | 950 | 9.6 | 680 | 153 |
| | 23 | Bal. | 12 | 1.2 | 0.2 | 1.8 | 0.2 | — | — | 0.2 | — | — | | 21.2 | 11.9 | 750 | 1000 | 10.9 | 720 | — |
| | 24 | Bal. | 14 | 1 | 0.5 | 3 | — | — | 0.1 | — | — | — | | 20.9 | 11.5 | 900 | 1050 | 10.1 | 680 | 150 |
| | 25 | Bal. | 20 | 0.2 | 1.1 | 3.5 | 0.1 | — | — | — | — | — | | 19.8 | 11.0 | 900 | 1050 | 10.0 | — | 154 |
| Com- | 26 | Bal. | 15 | 0.7 | 3 | 4 | — | 3 | — | — | — | 0.8 | — | 20.8 | 6.9 | 600 | 850 | 6.3 | 560> | 130> |
| parative | 27 | Bal. | 15 | 0.7 | 0.4 | 1.5 | 0.2 | — | — | — | — | 4 | — | 16.0 | 6.9 | 650 | 900 | 5.8 | 560> | 130> |
| Material | 28 | Bal. | 12 | 1 | 3 | 2.5 | 1 | — | — | — | 0.2 | — | — | 21.2 | 10.2 | 650 | 850 | 7.3 | 560 | 135 |
| | 29 | Bal. | 4 | 1 | 0.1 | 4 | — | — | — | — | — | — | Fe0.5 | 14.5 | 6.0 | 650 | 800 | 8.0 | 600 | 148 |

TABLE 7A

| | Al | Sn | Cu | Mg | Zr | Si | Pb | Mn | V | Nb | Mo | Co | Cr | Sb | Ni | Tensile strength kg/cm² 20° C. | Tensile strength kg/cm² 175° C. | Seizure surface pressure kg/cm² FCD70 Shaft | Seizure surface pressure kg/cm² S50C Shaft | Fatigue test Schenck | Fatigue test Alternating load | Fatigue test Rotating load |
|---|---|---|---|---|---|---|---|---|---|---|---|---|---|---|---|---|---|---|---|---|---|---|
| 1 | Bal. | 3 | 1 | — | 0.6 | 3 | — | — | — | — | — | — | — | — | — | 18.5 | 11.5 | 700 | 800 | 10.5 | — | 160 |
| 2 | Bal. | 4 | 0.2 | — | 0.9 | 1.5 | — | — | — | — | — | — | — | — | — | 19.0 | 12.0 | 600 | 700 | — | 720 | — |
| 3 | Bal. | 5 | 2 | — | 0.1 | 4 | — | — | — | — | — | — | — | — | — | 17.0 | 10.5 | 750 | 900 | — | — | 158 |
| 4 | Bal. | 7 | 0.1 | 1.2 | 0.4 | 2 | — | — | — | — | — | — | — | — | — | 15.5 | 9.5 | 750 | 900 | 9.8 | 680 | — |
| 5 | Bal. | 7 | 1 | — | 0.5 | 2.5 | — | — | — | — | — | — | — | — | — | 18.0 | 11.5 | 800 | 950 | 10.2 | — | 162 |
| 6 | Bal. | 7 | — | 1 | 0.2 | 8 | — | — | — | — | — | — | — | — | — | 16.5 | 9.0 | 850 | 950 | 8.8 | 640 | — |
| 7 | Bal. | 9 | 0.9 | — | 1 | 2.1 | — | — | — | — | — | — | — | — | — | 20.5 | 12.0 | 700 | 750 | 10.5 | — | — |
| 8 | Bal. | 11 | 2 | — | 0.3 | 7 | — | — | — | — | — | — | — | — | — | 22.0 | 11.5 | 800 | 900 | — | 720 | — |
| 9 | Bal. | 11 | 0.2 | — | 0.8 | 1.9 | — | — | — | — | — | — | — | — | — | 18.5 | 11.0 | 650 | 700 | — | 680 | 160 |
| 10 | Bal. | 11 | 1 | — | 0.5 | 2.5 | — | — | — | — | — | — | — | — | — | 18.0 | 11.0 | 650 | 700 | 10.0 | 680 | 162 |
| 11 | Bal. | 15 | 0.1 | 0.1 | 1 | 3 | — | — | — | — | — | — | — | — | — | 15.0 | 10.0 | 700 | 800 | 9.1 | — | — |
| 12 | Bal. | 15 | 1.2 | — | 0.7 | 3.2 | — | — | — | — | — | — | — | — | — | 21.0 | 11.5 | 750 | 850 | — | 680 | 158 |
| 13 | Bal. | 17 | 2 | — | 0.15 | 5 | — | — | — | — | — | — | — | — | — | 17.5 | 10.0 | 750 | 950 | 8.8 | — | — |
| 14 | Bal. | 19 | — | 0.5 | 0.6 | 2.8 | — | — | — | — | — | — | — | — | — | 15.0 | 8.5 | 650 | 900 | 8.3 | — | — |
| 15 | Bal. | 20 | 1 | — | 8.5 | 2.5 | — | — | — | — | — | — | — | — | — | 17.0 | 11.0 | 750 | 950 | 10.2 | 640 | 156 |
| 16 | Bal. | 4 | 1 | — | — | 4 | — | — | — | — | — | — | — | — | — | 13.5 | 5.0 | 650 | 800 | — | 560 | 145 |
| 17 | Bal. | 7 | 1 | — | 1 | — | — | — | — | — | — | — | — | — | — | 17.5 | 11.5 | 200 | 750 | 10.6 | 680 | 148 |
| 18 | Bal. | 11 | 1 | — | — | 3 | — | — | — | — | — | — | 0.5 | — | — | 18.0 | 8.5 | 750 | 950 | 7.5 | 640 | 148 |
| 19 | Bal. | 6 | 1 | — | — | 1.5 | — | — | — | — | — | — | — | — | 0.4 | 17.5 | 7.5 | 350 | 500 | 6.3 | — | — |
| 20 | Bal. | 20 | 1 | — | — | — | — | — | — | — | — | — | — | — | — | 10.5 | 4.0 | 200 | 850 | 4> | 560 | 152 |
| 21 | Bal. | 3 | 0.8 | — | 1 | 2.5 | 3 | — | — | — | — | — | — | — | — | 19.5 | 11.0 | 750 | 850 | — | 680 | — |
| 22 | Bal. | 4 | 1.2 | — | 0.1 | 1.5 | 5 | — | — | — | — | — | — | — | — | 15.0 | 9.0 | 650 | 900 | 8.6 | — | 164 |
| 23 | Bal. | 6 | 0.2 | — | 0.5 | 7 | 1.5 | — | — | — | — | — | — | — | — | 16.5 | 850 | 950 | 9.3 | — | — | — |
| 24 | Bal. | 8 | 0.1 | 1.5 | 0.8 | 1.5 | 0.1 | — | — | — | — | — | — | — | — | 18.5 | 10.5 | 650 | 700 | 9.8 | — | — |
| 25 | Bal. | 8 | 1 | — | 0.5 | 2.5 | 2 | — | — | — | — | — | — | — | — | 18.0 | 11.5 | 800 | 900 | — | 680 | 162 |
| 26 | Bal. | 8 | — | 2 | 0.3 | 8 | 1 | — | — | — | — | — | — | — | — | 18.0 | 10.0 | 800 | 850 | 9.2 | — | — |
| 27 | Bal. | 10 | 1.6 | — | 0.9 | 3 | 4 | — | — | — | — | — | — | — | — | 22.0 | 12.0 | 850 | 900 | — | 720 | 158 |
| 28 | Bal. | 12 | 0.1 | 0.4 | 0.2 | 1.9 | 2.9 | — | — | — | — | — | — | — | — | 15.0 | 9.0 | 750 | 850 | — | 640 | — |
| 29 | Bal. | 12 | 2 | — | 1 | 6 | 3.5 | — | — | — | — | — | — | — | — | 23.5 | 13.5 | 850 | 900 | 11.0 | — | — |
| 30 | Bal. | 12 | 1 | — | 0.5 | 2.5 | 3 | — | — | — | — | — | — | — | — | 18.5 | 11.0 | 850 | 950 | 10.2 | 680 | 164 |
| 31 | Bal. | 15 | — | 1.5 | 0.1 | 4 | 0.5 | — | — | — | — | — | — | — | — | 15.0 | 8.5 | 800 | 850 | 7.8 | — | 160 |
| 32 | Bal. | 15 | 0.5 | — | 0.6 | 2 | 4.5 | — | — | — | — | — | — | — | — | 18.0 | 10.0 | 850 | 900 | — | 640 | — |
| 33 | Bal. | 17 | 1.9 | — | 0.5 | 6 | 3 | — | — | — | — | — | — | — | — | 19.5 | 12.0 | 900 | 950 | 10.5 | — | — |
| 34 | Bal. | 19 | 0.5 | 0.5 | 0.4 | 1.5 | 0.5 | — | — | — | — | — | — | — | — | 17.0 | 9.0 | 600 | 700 | — | 640 | 158 |
| 35 | Bal. | 20 | 1.4 | — | 0.7 | 3.5 | 4 | — | — | — | — | — | — | — | — | 20.5 | 11.5 | 950 | 1050 | 9.8 | — | — |
| 36 | Bal. | 12 | 1 | — | 0.1 | 2.5 | 1.5 | — | — | — | — | — | — | — | — | 15.5 | 9.0 | 850 | 950 | 7.9 | 640 | 162 |

TABLE 7A-continued

| | Al | Sn | Cu | Mg | Zr | Si | Pb | Mn | V | Nb | Mo | Co | Cr | Sb | Ni | Tensile strength kg/cm² 20° C. | Tensile strength kg/cm² 175° C. | Seizure surface pressure kg/cm² FCD70 Shaft | Seizure surface pressure kg/cm² S50C Shaft | Fatigue test Schenck | Fatigue test Alternating load | Fatigue test Rotating load |
|---|---|---|---|---|---|---|---|---|---|---|---|---|---|---|---|---|---|---|---|---|---|---|
| 37 | Bal. | 12 | 1 | — | 0.5 | 2.5 | 1.5 | — | — | — | — | — | — | — | — | 18.5 | 11.0 | 850 | 950 | 10.2 | 680 | 164 |
| 38 | Bal. | 12 | 1 | — | 1 | 2.5 | 1.5 | — | — | — | — | — | — | — | — | 20.0 | 11.5 | 850 | 950 | 10.7 | 720 | 160 |
| 39 | Bal. | 12 | 1 | — | 0.1 | 3.5 | 1.5 | — | — | — | — | — | — | — | — | 16.0 | 9.0 | 900 | 950 | 7.8 | 640 | 164 |
| 40 | Bal. | 12 | 1 | — | 0.5 | 3.5 | 1.5 | — | — | — | — | — | — | — | — | 19.0 | 11.0 | 900 | 950 | 10.5 | 680 | 162 |
| 41 | Bal. | 12 | 1 | — | 1 | 3.5 | 1.5 | — | — | — | — | — | — | — | — | 20.0 | 11.5 | 950 | 1000 | 10.5 | 680 | 159 |
| 42 | Bal. | 12 | 1 | — | — | 2.5 | 1.5 | — | — | — | — | — | 0.1 | — | — | 13.5 | 6.5 | 850 | 950 | 5.5 | 600 | 150 |
| 43 | Bal. | 12 | 1 | — | — | 2.5 | 1.5 | — | — | — | — | — | 0.5 | — | — | 18.0 | 8.5 | 850 | 950 | 7.5 | 640 | 148 |
| 44 | Bal. | 12 | 1 | — | — | 2.5 | 1.5 | — | — | — | — | — | 1 | — | — | 19.5 | 9.5 | 850 | 950 | 8.3 | 680 | 142 |
| 45 | Bal. | 12 | 1 | — | — | 3.5 | 1.5 | — | — | — | — | — | — | 0.1 | — | 10.5 | 5.0 | 800 | 850 | 4.0 | 600 | 148 |
| 46 | Bal. | 12 | 1 | — | — | 3.5 | 1.5 | — | — | — | — | — | — | 1.5 | — | 11.0 | 5.5 | 850 | 900 | 4.8 | 600 | 138 |
| 47 | Bal. | 12 | 1 | — | — | 3.5 | 1.5 | — | — | — | — | — | — | 3 | — | 10.5 | 5.0 | 850 | 950 | 4.4 | 560 | 135 |
| 48 | Bal. | 8 | 1 | — | — | — | 2 | — | — | — | — | — | 0.5 | — | — | 15.5 | 9.0 | 350 | 800 | 7.2 | 680 | 147 |
| 49 | Bal. | 12 | 1 | — | — | 2.5 | 3 | — | — | — | — | — | 0.5 | — | — | 18.0 | 8.5 | 850 | 950 | 7.5 | 640 | 148 |
| 50 | Bal. | 17 | 1 | — | — | 2.5 | 3 | — | — | — | — | — | — | 2 | — | 11.0 | 5.0 | 800 | 900 | 6.5 | 600 | 140 |
| 51 | Bal. | 12 | 1 | — | 0.4 | 3.5 | 2 | — | — | — | — | — | — | 2 | — | 14.5 | 7.5 | 850 | 900 | 6.8 | 560 | 140 |
| 52 | Bal. | 12 | 1 | — | 0.4 | 2.5 | 2 | — | — | — | — | — | — | 4 | — | 12.5 | 6.5 | 800 | 900 | 5.6 | 560> | 130 |
| 53 | Bal. | 3 | 1.2 | — | 0.5 | 2 | — | 0.3 | — | — | — | — | — | — | — | 22.0 | 13.5 | 550 | 750 | — | 720 | — |
| 54 | Bal. | 5 | 0.6 | 0.4 | 0.1 | 8 | — | — | 0.05 | 0.1 | 0.1 | 0.1 | — | — | — | 18.5 | 10.0 | 800 | 850 | 9.5 | — | — |
| 55 | Bal. | 8 | 1 | — | 0.2 | 3 | — | 0.4 | — | — | — | — | — | — | — | 20.5 | 12.0 | 750 | 800 | 10.2 | 680 | 162 |
| 56 | Bal. | 12 | 2 | — | 0.1 | 6 | — | — | 0.9 | — | — | — | — | — | — | 22.5 | 13.0 | 800 | 850 | 10.5 | — | — |
| 57 | Bal. | 17 | 0.2 | — | 0.3 | 2.5 | — | — | — | — | 0.2 | — | — | — | — | 17.0 | 9.5 | 850 | 950 | 8.2 | — | — |
| 58 | Bal. | 20 | — | 2 | 0.1 | 1.5 | — | — | — | 0.1 | — | — | — | — | — | 16.5 | 8.0 | 650 | 800 | — | 640 | 158 |
| 59 | Bal. | 3 | — | 0.2 | 0.1 | 5 | 1 | 0.1 | 0.1 | 0.1 | 0.1 | 0.1 | — | — | — | 16.5 | 8.5 | 700 | 800 | 8.0 | — | — |
| 60 | Bal. | 4 | 2 | — | 0.7 | 2 | 5 | — | 0.3 | — | — | — | — | — | — | 21.5 | 11.0 | 750 | 300 | 10.8 | — | 158 |
| 61 | Bal. | 7 | 1 | — | 0.2 | 2.5 | 3 | 0.3 | — | — | — | — | — | — | — | 19.0 | 11.5 | 850 | 950 | — | 680 | — |
| 62 | Bal. | 11 | 0.7 | 0.8 | 0.3 | 1.5 | 2 | — | 0.1 | — | — | — | — | — | — | 19.5 | 12.5 | 650 | 750 | 9.8 | 680 | — |
| 63 | Bal. | 18 | 0.7 | — | 0.4 | 8 | 0.1 | — | — | 0.3 | — | — | — | — | — | 18.5 | 11.5 | 850 | 850 | 9.4 | — | — |
| 64 | Bal. | 20 | 1.3 | — | 0.1 | 3 | 1.5 | 0.1 | — | — | — | — | — | — | — | 17.5 | 10.0 | 900 | 950 | 8.6 | — | 160 |
| 65 | Bal. | 16 | 0.5 | 0.5 | — | 3 | — | 2 | — | — | — | — | 0.8 | 2 | — | 22.0 | 13.5 | 800 | 850 | 10.5 | 600 | 130> |
| 66 | Bal. | 15 | 1 | — | — | 3 | — | 1 | — | — | — | — | 0.6 | — | — | 21.5 | 12.5 | 750 | 850 | 10.0 | 600 | 143 |
| 67 | Bal. | 16 | 1 | — | — | 3 | 3 | 2 | — | — | — | — | 0.9 | — | — | 23.0 | 14.0 | 850 | 950 | 10.8 | 600 | 130> |
| 68 | Bal. | 15 | — | — | 0.2 | 3 | 2 | — | 0.5 | — | — | — | — | 2 | — | 14.5 | 6.5 | 850 | 900 | 6.0 | 560 | 130 |
| 69 | Bal. | 10 | — | — | — | 1 | 1 | 1 | — | — | 1 | — | — | 1 | — | 16.0 | 8.0 | 750 | 750 | 7.5 | 560 | 135 |

What is claimed is:

1. An aluminum bearing alloy consisting essentially, by percentage by weight, of 3 to 20% of Sn, 0.2 to 1.2% of Mn, 0.2 to 2% of Cu, 1.5 to 8% of Si, and the balance Al.

2. An aluminum bearing alloy according to claim 1, which contains at least one of V, Nb, Mo and Co, with a total additive quantity of said Mn and said at least one of V, Nb, Mo, and Co being selected to fall within a range of from 0.2% to 1.2% by weight.

* * * * *